(12) United States Patent
O'Meachair et al.

(10) Patent No.: US 9,610,931 B2
(45) Date of Patent: Apr. 4, 2017

(54) ADAPTIVE BRAKING SYSTEM AND METHOD

(71) Applicant: Bentley Motors Limited, Cheshire (GB)

(72) Inventors: Deaglan O'Meachair, Cheshire (GB); Matthew Crumpton, Cheshire (GB)

(73) Assignee: BENTLEY MOTORS LIMITED, Cheshire (GB)

( * ) Notice: Subject to any disclaimer, the term of this patent is extended or adjusted under 35 U.S.C. 154(b) by 0 days.

(21) Appl. No.: 14/433,045

(22) PCT Filed: Oct. 2, 2013

(86) PCT No.: PCT/GB2013/052560
§ 371 (c)(1),
(2) Date: Apr. 2, 2015

(87) PCT Pub. No.: WO2014/053827
PCT Pub. Date: Apr. 10, 2014

(65) Prior Publication Data
US 2015/0239448 A1  Aug. 27, 2015

(30) Foreign Application Priority Data
Oct. 2, 2012 (GB) .................................. 1217591.5

(51) Int. Cl.
*B60T 13/66* (2006.01)
*B60T 8/172* (2006.01)
(Continued)

(52) U.S. Cl.
CPC .............. *B60T 13/66* (2013.01); *B60T 8/171* (2013.01); *B60T 8/172* (2013.01); *B60T 8/175* (2013.01);
(Continued)

(58) Field of Classification Search
None
See application file for complete search history.

(56) References Cited

U.S. PATENT DOCUMENTS

| | | | | |
|---|---|---|---|---|
| 5,275,265 A | * | 1/1994 | Castel | ................... B60T 8/1812 188/195 |
| 6,275,763 B1 | * | 8/2001 | Lotito | ....................... B60L 7/26 180/165 |

(Continued)

FOREIGN PATENT DOCUMENTS

| | | |
|---|---|---|
| DE | 19911902 C1 | 8/2000 |
| DE | 19942290 A1 | 4/2001 |

(Continued)

*Primary Examiner* — Krishnan Ramesh
(74) *Attorney, Agent, or Firm* — Barlow, Josephs & Holmes, Ltd.

(57) ABSTRACT

An adaptive braking system for a motor vehicle includes an assisted braking system and a controller arranged to determine, in response to one or more driving condition parameters and in advance of a brake application, the braking assistance to be provided. Braking assistance is defined by a function which maps a brake actuation parameter to be applied from a detected brake pedal actuation parameter. Each driving condition parameter includes an environmental condition parameter. The controller may also adjust the braking assistance in response to one or more braking response signals.

15 Claims, 4 Drawing Sheets

(51) Int. Cl.
*B60T 8/171* (2006.01)
*B60T 8/175* (2006.01)
*B60T 8/176* (2006.01)

(52) U.S. Cl.
CPC ........... *B60T 8/176* (2013.01); *B60T 2201/03* (2013.01); *B60T 2210/12* (2013.01)

(56) References Cited

U.S. PATENT DOCUMENTS

| | | | | |
|---|---|---|---|---|
| 6,671,604 B1* | 12/2003 | Frentz | ........................ | B60T 8/00 180/197 |
| 2002/0005662 A1* | 1/2002 | Yasui | ...................... | B60T 8/172 303/150 |
| 2005/0040700 A1* | 2/2005 | Yokoyama | .............. | B60T 7/042 303/20 |
| 2005/0143892 A1* | 6/2005 | Batistic | .............. | B60G 17/0162 701/82 |
| 2007/0100530 A1* | 5/2007 | Mori | .................... | B60T 8/4872 701/70 |
| 2008/0210499 A1* | 9/2008 | Isono | ...................... | B60T 8/328 188/72.4 |
| 2008/0265664 A1* | 10/2008 | Fulmer | ..................... | B60T 8/38 303/113.4 |
| 2012/0303232 A1* | 11/2012 | Yoshii | ..................... | B60T 13/52 701/70 |
| 2013/0297168 A1* | 11/2013 | Svensson | ............... | B60T 8/1755 701/70 |
| 2013/0332041 A1* | 12/2013 | Kim | ........................ | B60T 8/441 701/70 |
| 2014/0025271 A1* | 1/2014 | Fahland | .................... | B60T 1/10 701/70 |
| 2014/0136069 A1* | 5/2014 | Jung | ...................... | B60T 13/662 701/70 |
| 2014/0180555 A1* | 6/2014 | Eckert | .................. | B60T 8/1708 701/79 |
| 2015/0035980 A1* | 2/2015 | Krokel | .................. | G01N 21/21 348/148 |
| 2015/0085118 A1* | 3/2015 | Ahiad | .................. | B60S 1/0844 348/148 |
| 2015/0321649 A1* | 11/2015 | Jeon | ...................... | B60T 8/3275 701/70 |

FOREIGN PATENT DOCUMENTS

DE 102010002574 A1 9/2011
EP 1081006 A2 3/2001

\* cited by examiner

ADAPTIVE BRAKING SYSTEM AND METHOD

TECHNICAL FIELD OF THE INVENTION

The present invention relates to braking systems for use in motor vehicles, such as automobiles.

BACKGROUND TO THE INVENTION

The performance of braking systems on motor vehicles may vary depending on a host of parameters affecting the frictional forces in the brake and the corresponding deceleration experienced by the vehicle. For example, frictional forces in the brake can be significantly reduced when brakes are overheating or wet, so that a driver must operate the brake pedal more firmly than usual. Other conditions, such as the vehicle payload and road surface may also affect the deceleration response achieved under a given brake pedal application. In particular, wet or icy roads may dramatically reduce the vehicle's braking responsiveness, substantially braking distances. However, while wet roads may encourage more forceful braking than under dry conditions, icy or loose road surfaces may require more gradual braking so as to avoid skidding or swerving.

It is therefore necessary for drivers to adapt their braking techniques in different ways to suit a wide range of different driving conditions, some of which—such as overheating brakes or icy roads—may not be immediately apparent until the driver begins to lose control of the vehicle. Poor weather conditions are known to increase the incidence of collisions and other road traffic accidents, even though such conditions and the risk they present may generally be apparent to drivers.

It is therefore an object of embodiments of the present invention to provide an improved braking system and method which adapt to safely accommodate changing or hazardous driving conditions. It is another object of embodiments of the present invention to provide an improved braking system and method which minimises the variation in braking techniques required of a driver for safely handling a vehicle under a range of driving conditions. It is a further object of embodiments of the present invention to improve road safety and reduce the risk of collisions.

SUMMARY OF THE INVENTION

According to a first aspect of the invention, there is provided an adaptive braking system for a motor vehicle, the system comprising an assisted braking system and a controller arranged to determine, in response to one or more driving condition parameters and in advance of a brake application, the braking assistance to be provided, wherein said braking assistance is defined by a function which maps a brake actuation parameter to be applied from a detected brake pedal application parameter, and wherein the or at least one said driving condition parameter comprises an environmental condition parameter.

The braking response may be adapted to compensate for adverse driving conditions, such as overheating brakes and wet or icy roads, and/or to allow the driver to safely and conveniently apply a constant braking technique under many different driving conditions.

Environmental condition parameters may include signals from one or more of an atmospheric air temperature sensor, an atmospheric pressure sensor, a relative humidity sensor and a rainfall detection sensor.

The driving condition parameters may also include one or more vehicle condition parameters, which may include signals from one or more of a brake disc temperature sensor a wheel speed sensor and a vehicle motion sensor.

At least one driving condition parameter may be computed from a plurality of parameters, such as a plurality of environmental condition parameters and/or a plurality of vehicle condition parameters.

The function which maps a brake actuation parameter to be applied from a brake pedal application parameter may be a monotonic function. It may be a substantially linear function over part or substantially all of a range of pedal application parameters. The controller may be arranged to determine the gradient of the linear function, or any linear part of the function, in response to the one or more driving condition parameters. As such, the gain, or effective pedal ratio, for all or part of a range of possible pedal actuation parameters is determined, according to driving conditions, in advance of brake application.

The brake actuation parameter may comprise a brake actuation force or brake fluid pressure, and the pedal application parameter may comprise a signal from a load, pressure, strain or displacement sensor arranged to detect brake pedal loading or travel.

Adjusting the braking assistance may comprise adjusting one or more of a constant, a coefficient, and an exponent of the function. Increasing the braking assistance may comprise increasing one or more of a constant, a coefficient, and an exponent of the function. Decreasing the braking assistance may comprise decreasing one or more of a constant, a coefficient, and an exponent of the function.

The adaptive braking system may comprise one or more elements selected from an electro-mechanical brake booster unit supplying variable brake-fluid pressure to an electronic stability control and/or assisted braking system modulator; a variable hydraulic pump; a central solenoid valve; and a respective pressure-modulating valve on the brake fluid supply to each wheel, wherein the controller is arranged to adjust the braking assistance by varying the state of each said element in response to the driving condition parameters.

The controller may be arranged to temporarily increase braking assistance in response to signals from at least one of a brake disc temperature sensor, a rainfall detection sensor, an atmospheric temperature sensor, an atmospheric pressure sensor, and an atmospheric humidity sensor. The controller may be arranged to temporarily reduce braking assistance in response to signals from at least one of an atmospheric temperature sensor, an atmospheric pressure sensor, and an atmospheric humidity sensor. The controller may be arranged to temporarily reduce braking assistance in response to a combination of the signals from a wheel speed sensor and a vehicle motion sensor. The controller may be arranged to temporarily increase braking assistance in response to a combination of: (a) signals from at least one of a load or strain sensor arranged to detect brake component loading, a pressure sensor arranged to detect brake fluid pressure, and a load, pressure, strain or displacement sensor arranged to detect brake pedal loading or travel; and (b) signals from at least one of a wheel speed sensor and a vehicle motion sensor.

The vehicle motion sensor or sensors may comprise an accelerometer and may comprise a camera or scanning sensor arranged to detect a road surface image.

The adaptive braking system may comprise one or more of an anti-lock braking system, a traction control system, and an electronic stability control system.

The controller may additionally be arranged to adjust the braking assistance in response to one or more braking response signals, which may include signals from at least one of a wheel speed sensor and a vehicle motion sensor, and may include signals from at least one of a load or strain sensor arranged to detect brake component loading, a pressure sensor arranged to detect brake fluid pressure, and a load, pressure, strain or displacement sensor arranged to detect brake pedal loading or travel. That is to say, the controller may be arranged to adjust braking assistance during brake application in addition to determining the level of assistance to be provided prior to brake application.

According to a second aspect of the invention, there is provided a motor vehicle comprising such an adaptive braking system.

The motor vehicle may be an automobile.

According to a third aspect of the invention, there is provided an adaptive braking method for a motor vehicle, the method comprising the steps of: monitoring one or more driving conditions; determining, in response to the one or more driving conditions and in advance of a brake application, braking assistance to be provided by an assisted braking system; and adjusting, as determined in response to the driving conditions, the braking assistance provided by the assisted braking system, wherein said braking assistance is defined by a function which maps a brake actuation parameter to be applied to a detected brake pedal application parameter, and wherein the one or more driving condition comprises an environmental condition.

Environmental conditions may include atmospheric air temperature, atmospheric pressure, relative humidity and rainfall, may include predicted or detected road wetness, may include predicted or detected road iciness, and may include a detected increase in tyre-road slip.

The driving conditions may also one or more vehicle conditions, which may include brake disc temperature, wheel speed and vehicle motion.

The method may include the step of computing at least one said driving condition from a plurality of environmental conditions or vehicle conditions. Predicted road wetness and predicted road iciness may each be computed as a function of atmospheric air temperature, atmospheric pressure, and relative humidity. Tyre-road slip may be computed as a function of wheel angular velocity and vehicle velocity or as a function of wheel angular acceleration and vehicle acceleration.

The function which maps a brake actuation parameter to be applied to a detected brake pedal application parameter may be a monotonic function. It may be a substantially linear function over part or substantially all of a range of pedal application parameters. The controller may be arranged to determine a gradient of the linear function, or any linear part of the function, in response to one or more driving condition parameters.

Adjusting the braking assistance may comprise adjusting one or more of a constant, a coefficient, and an exponent of the function. Increasing the braking assistance may comprise increasing one or more of a constant, a coefficient, and an exponent of the function. Decreasing the braking assistance may comprise decreasing one or more of a constant, a coefficient, and an exponent of the function.

Adjusting the braking assistance may comprise adjusting one or more of a brake booster unit, a variable hydraulic pump, a central solenoid valve, and a respective pressure-modulating valve set on a brake fluid supply to each brake. Adjusting the braking assistance may comprise maintaining a steady braking assistance level while driving conditions remain within normal thresholds, and may comprise maintaining a steady braking assistance level while braking response conditions fall within normal thresholds. The normal thresholds may comprise braking response parameters substantially equal to those determined under predetermined safe driving conditions, and may comprise braking response parameters substantially equal to those determined under dry conditions at an ambient temperature of 20 degrees Celsius and a brake disc temperature not exceeding 100 degrees Celsius.

The adaptive braking method may comprise the step of limiting, during brake application, any reduction of the braking assistance in response to the driving conditions, and may comprise the step of limiting, during brake application, any adjustment of the braking assistance in response to the driving conditions. Limiting the reduction or adjustment of braking assistance may comprise preventing any reduction or adjustment of braking assistance, or may comprise limiting the rate of adjustment of braking assistance.

Adjusting the braking assistance may comprise temporarily increasing braking assistance in response to an adverse driving condition, and may comprise temporarily increasing braking assistance in response to elevated brake disc temperature, detected rainfall, or predicted road wetness.

Adjusting the braking assistance may comprise temporarily reducing braking assistance in response to an adverse driving condition, and may comprise temporarily reducing braking assistance in response to predicted road iciness or to a detected increase in tyre-road slip.

Adjusting the braking assistance may comprise temporarily increasing braking assistance in response to an adverse braking response parameter, and may comprise temporarily increasing braking assistance in response to a reduction in detected brake responsiveness or a reduction in detected braking friction.

The adaptive braking method may comprise the steps of monitoring one or more braking response conditions and adjusting, in response to the braking response conditions, the braking response provided by the assisted braking system. The braking response parameters may include at least one of vehicle deceleration and the angular deceleration of a wheel axle, and may include at least one of the force or strain experienced by a brake component, the brake fluid pressure, and the force, pressure, strain, or displacement experienced by a brake pedal. The braking response parameters may include a braking responsiveness parameter and may include a braking friction parameter.

DETAILED DESCRIPTION OF THE INVENTION

In order that the invention may be more clearly understood, embodiments thereof will now be described, by way of example only, with reference to the accompanying drawings, of which:

The invention concerns adaptive adjustment of the braking response to accommodate detected and/or predicted driving conditions and/or observed braking response behaviour. Braking response is provided as a function of the applied pedal force or travel to which we refer generally as the braking assistance. This may be a linear function characterised by an effective brake pedal ratio, may partially or loosely approximate a linear function, or may be a highly nonlinear function. Increased braking assistance is provided, for example, by an increase in the effective pedal ratio or, more generally, by increasing a gradient and/or offset in the pedal response function or a portion thereof.

Various mechanisms may be suitable for adjusting the braking assistance. In one embodiment, adjustment is made via a brake booster unit. A brake booster typically converts brake pedal force or travel into brake fluid pressure by means of a piston arrangement, the applied pedal force receiving a mechanical advantage such as by means of a vacuum supply connected to the piston. The braking response may be adjusted by varying the pressure of the vacuum supply or by means of a solenoid valve in the brake booster unit or in the brake master cylinder. A hydraulic pump may also be controlled to vary brake fluid pressure. Alternatively, or in addition, braking response may be adjusted for each wheel by means of the valves provided as part of an anti-lock braking system for varying the brake fluid pressure to each brake. In any of the above embodiments, a dedicated central control unit may be used to monitor input driving condition input signals and to control the brake booster vacuum pressure, the brake fluid pressure adjustment pumps and/or valves, and/or other controllable brake actuation means. In preferred embodiments, brake fluid pressure is centrally controlled by means of an integrated actuation control module.

In preferred embodiments, the adaptive braking system is integrated with—and makes use of the infrastructure that forms—the combined anti-lock braking system (ABS), traction control system (TCS), and electronic stability control system (ESC). In this case, desired braking response is controlled by a central electronic control unit (ECU) that controls the combined anti-lock braking, traction, and stability systems. Many or all of the information required by the ECU for determining a desired brake response may be provided by same the sensors that inform the ABS, TCS, and ESC systems, such as wheel speed sensors and accelerometers.

Figure 1:
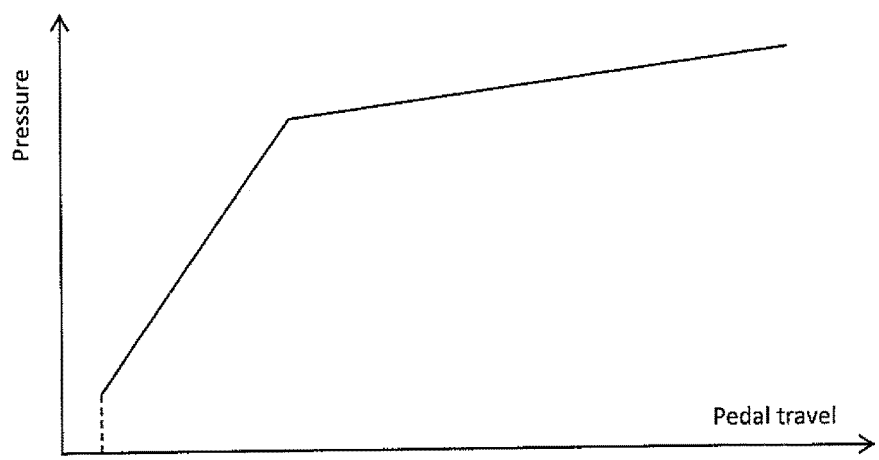
FIG. 1 is a graph showing an effective brake pedal response function under normal driving conditions, according to an embodiment of the present invention.
Figure 2:
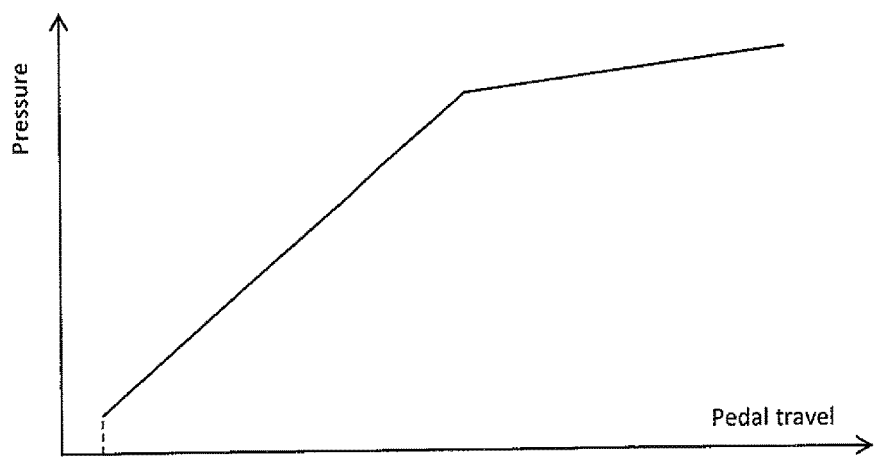
FIG. 2 is a graph showing a brake pedal response function for the embodiment of FIG. 1 when adjusted to accommodate a lower road grip scenario.
Figure 3:
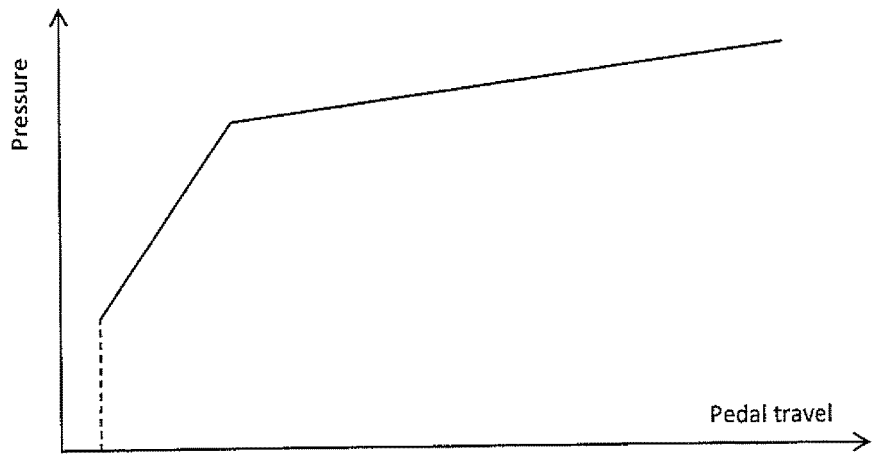
FIG. 3 is a graph showing a brake pedal response function for the embodiment of FIG. 1 when adjusted to accommodate a lower brake disc friction scenario.

In simple schematic form, desired braking behaviour for an embodiment of the invention is indicated in the effective pedal response functions of FIGS. 1-3. FIG. 1 shows a linear relation between the applied brake pedal travel and the resulting brake fluid pressure. The gradient of this line represents the effective brake pedal ratio, which may reflect the gain factor applied to the pedal force or travel by a brake booster unit or master cylinder, and in this case contributes toward overall brake responsiveness. Alternatively, or in addition, the function may represent the desired brake pressure as adjusted by one or each brake pressure valve pair in an ABS and/or ESC system.

Above a certain threshold, the ABS intervenes to automatically limit the braking response in order to prevent locking of the brakes, as indicated by a reduced gradient at higher braking fluid pressures. Below a certain threshold representing minimal pedal force or travel, the braking response may drop away abruptly or nonlinearly to zero, as indicated by a dashed line.

Under icy conditions or on loose road surfaces, braking should generally be applied more gradually to reduce the risk of skidding or swerving. This is indicated in FIG. 2, which shows a similar relation to FIG. 1 except that the braking response has been intentionally limited to accommodate reduced road grip, corresponding with a 'lightening' of the brakes.

Frictional behaviour of the brake system may be adversely affected by elevated brake temperatures, known as 'brake softening', as commonly occurs in carbon ceramic brake discs. Water ingress can also adversely affect frictional brake performance. FIG. 3 indicates the behaviour envisaged in case of such a reduction in of brake disc friction. In this case, the braking response function or pedal ratio is intentionally boosted to apply a greater force on the brakes in compensation for the reduced friction coefficient, so as to maintain a preferred level of perceived braking 'power' or responsiveness.

Brake locking behaviour may be affected by brake disc temperature, but it is envisaged that the ABS would automatically compensate for such changes, so that the low-gradient region of FIG. 3, defined by the ABS behaviour, need not closely resemble the corresponding region of FIG. 1. In practice, ABS intervention would introduce fluctuation and may decouple braking response from pedal input. There will be some interaction between the adaptive braking system of the present invention and the ABS, at least in terms of their respective influence on brake fluid line pressure at each wheel. However, the two systems should not inhibit one another's functionality.

It may be sufficient simply to vary the effective brake pedal ratio as a single variable to accommodate different driving conditions. However, it is also envisaged that an offset may be introduced, so that the brake response is not a directly proportional one. In the case indicated in the low brake disc friction scenario of FIG. 3, the pedal response function is offset so that a slight application of the brake pedal causes a substantial brake response, which may be necessary to compensate for nonlinear frictional behaviour, for example, or to enhance braking sensitivity or 'bite' without excessive further overheating of the brake disc. Furthermore, a nonlinear pedal response may be preferable and is also envisaged in alternative embodiments. In such embodiments the assistance provided by a brake booster unit or master cylinder need not be limited to a constant value of gain or pedal ratio, but should be understood to also encompass a nonlinear pedal response function or gain function that varies with pedal force or travel. Such a function may be empirically derived to achieve a braking response optimised for safety or comfort, for example.

In various embodiments, the driving condition information used to inform the central controller or ECU may include any or all of the following:

Brake disc temperature sensors monitor each brake, allowing the brake disc friction coefficient to be predicted;

Atmospheric temperature, pressure, and humidity sensors provide signals for use in predicting rainfall and/or ice formation;

A rainfall detection sensor provides a signal if rain is detected;

Road surface scanning cameras or other sensors may be used to detect road conditions associated with grip, such as the presence of potholes, water, or ice;

Wheel speed sensors and vehicle motion sensors (such as accelerometers and/or road surface imaging sensors) provide signals that can be used to detect relative wheel and vehicle velocities, indicating tyre-road slip for each wheel; and The same wheel speed sensors and vehicle motion sensors also provide signals that can be used to detect relative wheel and vehicle accelerations, indicating rates of change in tyre-road slip for each wheel.

Figure 4:
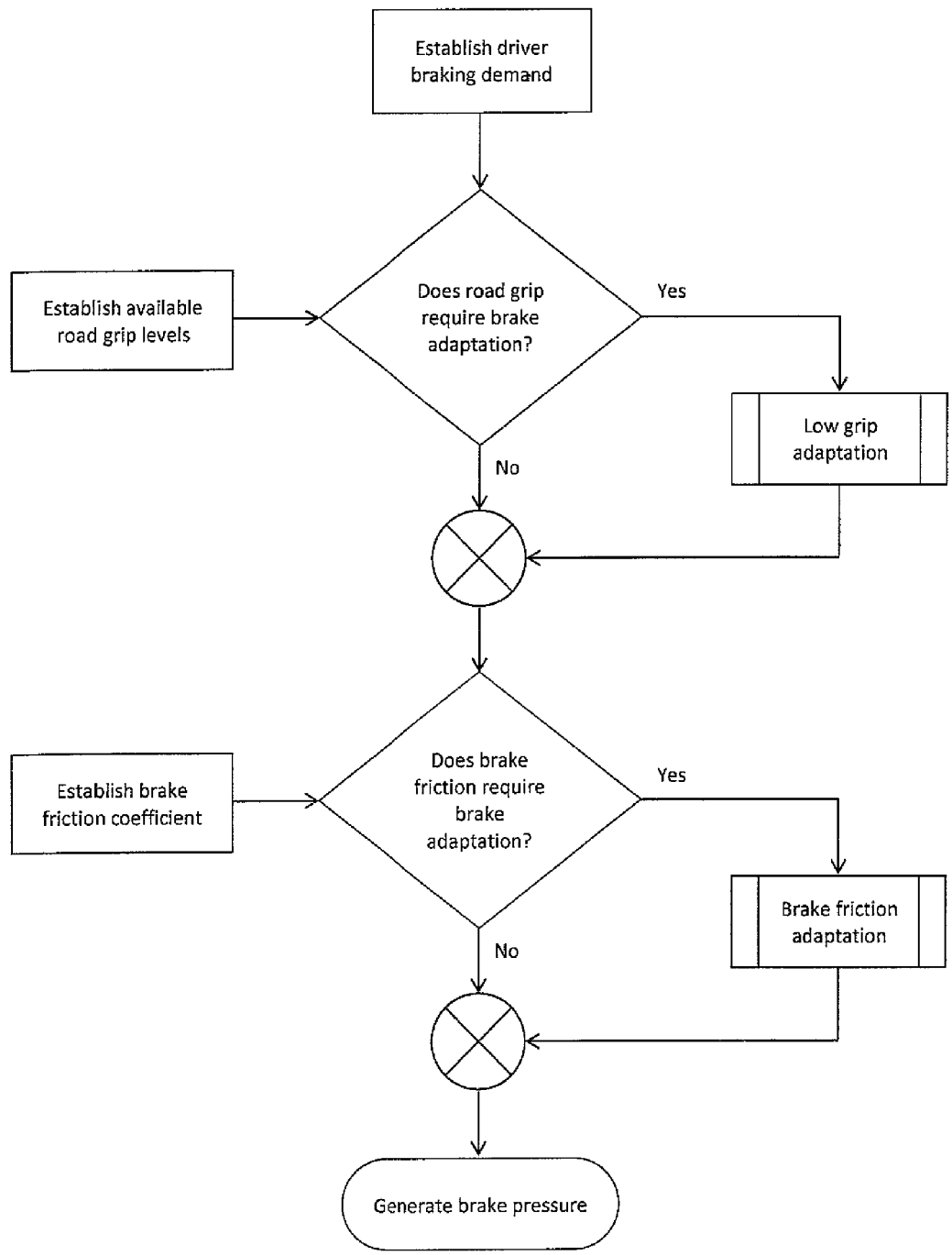
FIG. 4 is a flowchart indicating brake pressure adaptation in response to monitored road grip and/or brake friction parameters, according to embodiments of the present invention.

In an embodiment illustrated in FIG. 4, the braking assistance (for example, the effective pedal ratio or the braking response as a function of the pedal force/travel applied by the driver) is controlled by checking for road grip and brake friction and adapting the brake pressure accordingly. The road grip and brake friction may be assessed predictively from periodic driving condition signals and/or may be computed during brake application from vehicle deceleration, wheel deceleration, and brake fluid pressure signals. The braking assistance is reduced in response to a reduction in road grip and boosted in response to a reduction in brake disc friction.

To prevent a perceived and possibly dangerous fluctuation in braking assistance, adjustment of the braking assistance may be limited (or inhibited entirely) during the period in which the brake pedal is applied. For example, during brake application, the braking assistance may be fixed or permitted only to increase. The rates at which braking assistance is increased and decreased may also be restricted, during brake application, to predefined levels.

In addition to the aforementioned driving conditions, real-time braking response feedback obtained from sensors can also be used to adjust the braking response. While the driving conditions may be monitored continuously or periodically to help predict braking conditions in advance, braking response feedback must be detected and computed at high sampling rates while the brakes are being applied. In various embodiments, the braking response information used to inform the central controller or ECU may include any or all of the following:

A force, displacement, pressure, or strain sensor on the brake pedal is used to derive the force or travel it experiences;

A force or strain sensor in a brake component is used to deduce the brake loading;

Pressure sensors in the brake fluid are used to monitor brake fluid pressure centrally and/or at each brake;

Wheel speed sensors are used to compute the deceleration of each wheel;

Vehicle motion sensors, such as accelerometers, are used to compute vehicle deceleration;

The relationship between vehicle deceleration and pedal force/travel provides an effective braking responsiveness function;

The relationship between braking force or brake fluid pressure and pedal force/travel provides an effective pedal response function; and The relationship between wheel deceleration and local braking force or brake fluid pressure provides a brake disc frictional behaviour function.

Any of these functions may simply be treated as a ratio, or may be modelled in a more complex way.

Figure 5:
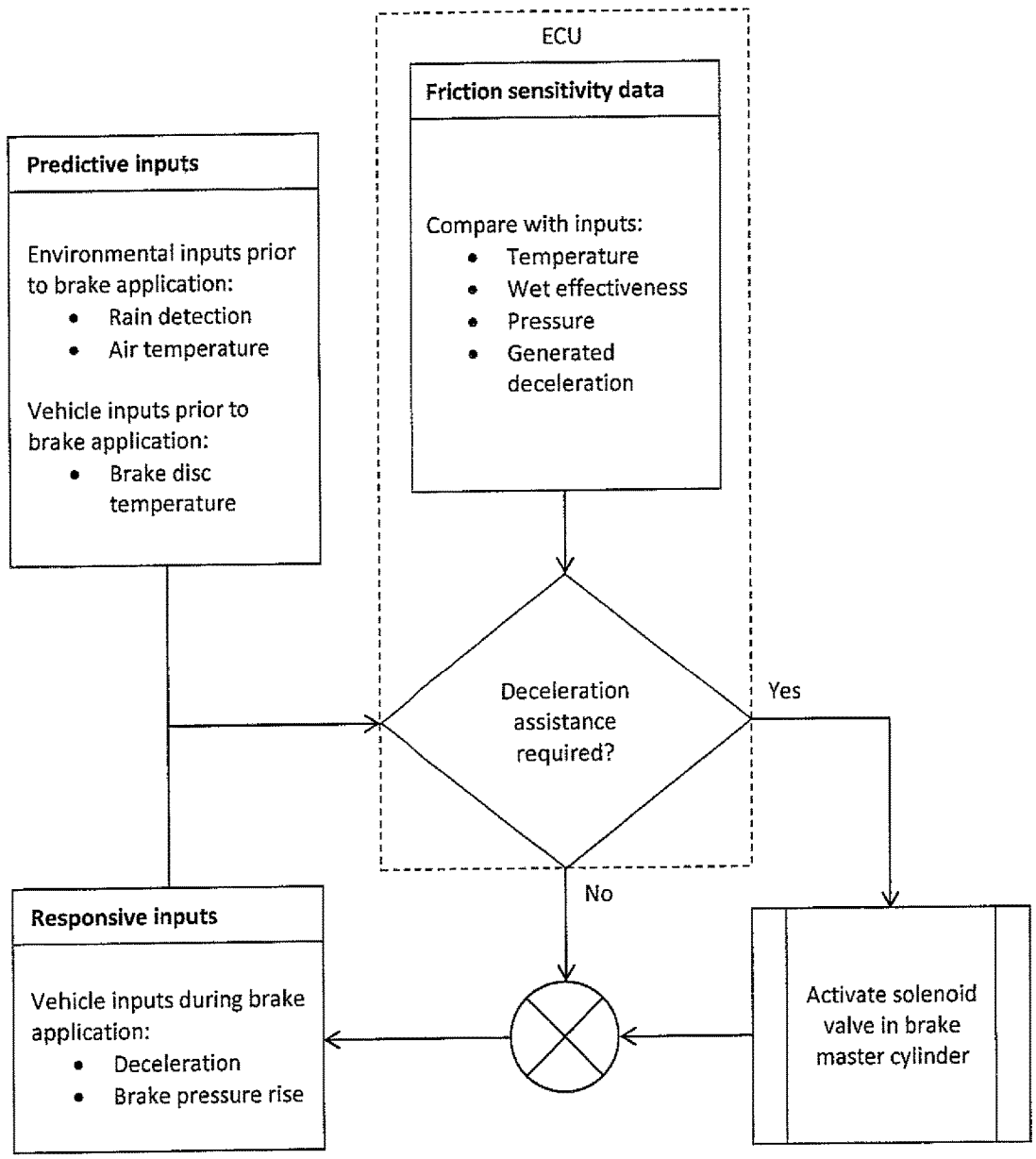
FIG. 5 is a flowchart indicating brake pressure adaptation in response to predictive driving condition inputs and braking response feedback inputs, according to embodiments of the present invention.

In an embodiment shown in FIG. 5, both predictive driving condition inputs and responsive braking feedback inputs are used to inform a braking assistance algorithm performed by the ECU. The algorithm is informed by data relating the detected signal variables together so as to effectively model a desired or optimal braking output. A brake fluid pressure valve is actuated in response to changes in the desired braking output.

The algorithm may be informed by empirical data derived from driving comfort or safety tests in a range of different driving conditions, and may be informed by experimental data such as obtained from detailed vehicle friction analysis using temperature, pressure, and wet-sensitivity data as well as dynamometer-based friction measurements.

Figure 6:
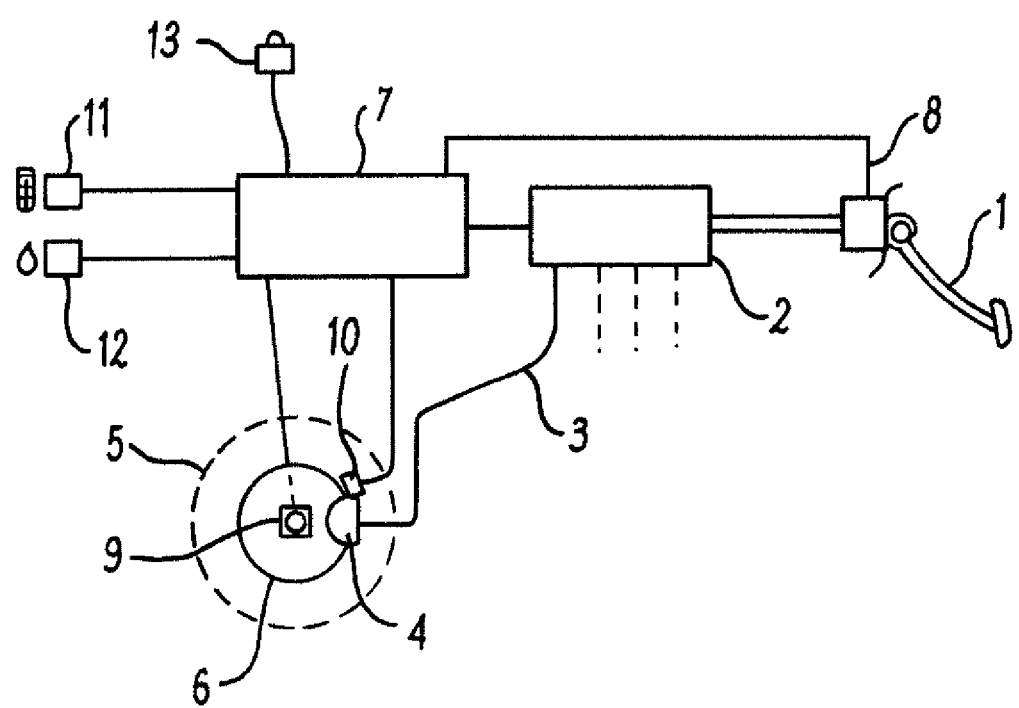
FIG. 6 is a schematic diagram of elements of an adaptive braking system according to an embodiment of the invention.

FIG. 6 shows a possible implementation of an adaptive braking system. An automobile is provided with a brake pedal 1 mounted in the driver's footwell. The brake pedal is operatively connected to an assisted braking system 2 comprising a master hydraulic cylinder and a brake booster arranged to provide a variable degree of assistance to the driver's braking effort. The master cylinder is connected by hydraulic lines 3 to callipers 4 associated with each road wheel 5 of the vehicle. The calipers 4 are operable to clamp a brake disc 6 associated with each wheel in a conventional way. A controller 7 is provided and operatively connected to the assisted braking system 2 in order to determine the level of assistance provided to the driver by the brake booster. The controller is also operatively connected to various sensors including a pedal force sensor 8 associated with the brake pedal in order to determine the braking effort applied by a driver and calculate a brake pedal actuation parameter. The controller is also detected to a wheel motion sensor 9, a temperature sensor 10 arranged to determine the temperature of brake disc 6, temperature sensor 11 and relative humidity sensor 12 to determine atmospheric conditions and a rain detector 13. The controller is arranged, as discussed above, to determine an appropriate function for mapping force applied to the driver's brake pedal 1 to the braking force applied by the callipers 4. That function is computed in advance of brake application, although, as also discussed above, the function may be altered following brake application in certain circumstances.

The above embodiments are described by way of example only. Many variations are possible without departing from the scope of the invention as defined in the appended claims.

The invention claimed is:

1. An adaptive braking system for a motor vehicle, the system comprising an assisted braking system and a controller configured to automatically determine, in response to one or more driving condition parameters and in advance of a brake application, a braking assistance to be provided, wherein the one or more driving condition parameters comprises an environmental condition parameter and said braking assistance is defined by a function which maps a brake actuation parameter to be applied from a detected brake pedal application parameter representing the force or travel experienced by a brake pedal; and further wherein said controller is configured to:
   a. compute the function so that a gradient of at least part of the function is adjusted in response to the one or more driving condition parameters in advance of the brake application; and
   b. limit or prevent, during said brake application, any adjustment of the braking assistance in response to the one or more driving condition parameters.

2. An adaptive braking system according to claim 1 wherein the environmental condition parameter includes signals from one or more of an atmospheric air temperature sensor, atmospheric pressure sensor, relative humidity sensor, rainfall detection sensor or road wetness detector.

3. An adaptive braking system according to claim 1 wherein the driving condition parameters further comprise one or more vehicle condition parameters that includes signals from one or more of a brake disc temperature sensor, a wheel speed sensor, and a vehicle motion sensor.

4. An adaptive braking system according to claim 1 wherein the function is a substantially linear function over part or substantially all of a range of pedal application parameters and wherein the controller determines the gradient of the linear function.

5. An adaptive braking system according to claim 1 wherein the controller is configured to temporarily increase braking assistance in response to signals from at least one of a brake disc temperature sensor, a rainfall detection sensor, an atmospheric temperature sensor, an atmospheric pressure sensor, an atmospheric humidity sensor, a load or strain sensor configured to detect brake component loading, a pressure sensor configured to detect brake fluid pressure, a load, pressure, strain or displacement sensor configured to detect brake pedal loading or travel, a wheel speed sensor, a vehicle motion sensor and combinations thereof.

6. An adaptive braking system according to claim 1 wherein the controller is configured to temporarily reduce braking assistance in response to signals from at least one of an atmospheric temperature sensor, an atmospheric pressure sensor, an atmospheric humidity sensor, a wheel speed sensor, a vehicle motion sensor and combinations thereof.

7. An adaptive braking system according to claim 1 wherein the controller is also configured to adjust the braking assistance in response to one or more braking response signals from at least one of a wheel speed sensor and a vehicle motion sensor.

8. A motor vehicle comprising an adaptive braking system, the system comprising an assisted braking system and a controller configured to automatically determine, in response to one or more driving condition parameters and in advance of a brake application, a braking assistance to be provided, wherein the one or more driving condition parameters comprises an environmental condition parameter and said braking assistance is defined by a function which maps a brake actuation parameter to be applied from a detected brake pedal application parameter representing the force or travel experienced by a brake pedal; and further wherein said controller is configured to:
 a. compute the function so that a gradient of at least part of the function is adjusted in response to the one or more driving condition parameters in advance of the brake application; and
 b. limit or prevent, during said brake application, any adjustment of the braking assistance in response to the one or more driving condition parameters.

9. An adaptive braking method for a motor vehicle, the method comprising the steps of:
 a. monitoring one or more driving conditions;
 b. determining, in response to the one or more driving conditions and in advance of a brake application, the braking assistance to be provided by an assisted braking system;
 c. adjusting, as determined in response to the driving conditions, the braking assistance provided by the assisted braking system,
 wherein the one or more driving conditions comprise an environmental condition, and said braking assistance is defined by a function which maps a brake actuation parameter to be applied from a detected brake pedal application parameter representing the force or travel experienced by a brake pedal;
 d. determining the braking assistance to be provided comprises computing said mapping function, so that a gradient of at least part of the function is adjusted in response to the driving conditions, in advance of the brake application; and
 e. limiting or preventing, during said brake application, said adjustment of the braking assistance in response to the driving conditions.

10. An adaptive braking method according to claim 9 wherein said environmental condition includes one or more of atmospheric air temperature, atmospheric pressure, relative humidity, rainfall, predicted or detected road wetness, predicted or detected road iciness and a detected increase in tyre-road slip.

11. An adaptive braking method according to claim 9 wherein the driving conditions include one or more vehicle conditions comprising brake disc temperature, wheel speed and vehicle motion.

12. An adaptive braking method according to claim 9 wherein the function is a substantially linear function over part or substantially all of the range of said pedal application parameters, and wherein the gradient of the linear function, or any linear part of the function, is adjusted in response to the driving conditions.

13. An adaptive braking method according to claim 9 further comprising the steps of monitoring one or more braking response parameters and adjusting, in response to the braking response parameters, the braking assistance provided by the assisted braking system, wherein the braking response parameters include:
 a. at least one of vehicle deceleration and angular deceleration of a wheel axle; and
 b. at least one of the force or strain experienced by a brake component, brake fluid pressure, and force, pressure, strain, or displacement experienced by a brake pedal.

14. An adaptive braking method according to claim 9 wherein adjusting the braking assistance comprises
 temporarily increasing braking assistance in response to an adverse driving condition, including detected rainfall, predicted road wetness, elevated brake disc temperature, and/or
 temporarily increasing braking assistance in response to an adverse braking response parameter, including a reduction in detected brake responsiveness or a reduction in braking friction coefficient.

15. An adaptive braking method according to claim 9 wherein adjusting the braking assistance comprises temporarily reducing braking assistance in response to an adverse driving condition, including predicted road iciness or increased tyre-road slip.

* * * * *